United States Patent [19]

Mueller et al.

[11] 4,281,500

[45] Aug. 4, 1981

[54] WRAPPING APPARATUS AND METHOD

[75] Inventors: George P. Mueller, Neenah; Urban A. Urban, Menasha; Kermit J. Muenster, Appleton; Donald A. Ludwig, Hortonville, all of Wis.

[73] Assignee: Wisconsin Tissue Mills Inc., Menasha, Wis.

[21] Appl. No.: 57,289

[22] Filed: Jul. 13, 1979

[51] Int. Cl.³ .............................................. B65B 11/04
[52] U.S. Cl. ........................................ 53/211; 53/465
[58] Field of Search ................. 53/465, 211, 176, 587, 53/556

[56] References Cited

U.S. PATENT DOCUMENTS

| | | | |
|---|---|---|---|
| 1,570,266 | 1/1926 | Ljungstrom | 53/211 |
| 1,654,258 | 12/1927 | Hooper | 53/176 X |
| 1,870,399 | 8/1932 | Butler | 53/211 X |
| 2,564,594 | 8/1951 | Clarke | 53/587 X |
| 2,936,559 | 5/1960 | Galley | 53/211 |
| 3,514,920 | 6/1970 | Hoffler | 53/214 |
| 3,863,425 | 2/1975 | Edwards | 53/211 |
| 4,050,221 | 9/1977 | Lancaster | 53/211 X |
| 4,077,179 | 3/1978 | Lancaster | 53/211 X |

Primary Examiner—John Sipos
Attorney, Agent, or Firm—Quarles & Brady

[57] ABSTRACT

Cylindrical rolls of paper (1, 96, 315) are completely enclosed with wrapping material (105) by simultaneously rotating the roll about its longitudinal axis and rotating the roll end-for-end. A turntable (35, 200) may be used to rotate the roll end-for-end, and a drive roll (65, 265) carried by the turntable is driven to rotate the roll about its longitudinal axis during rotation of the turntable.

2 Claims, 25 Drawing Figures

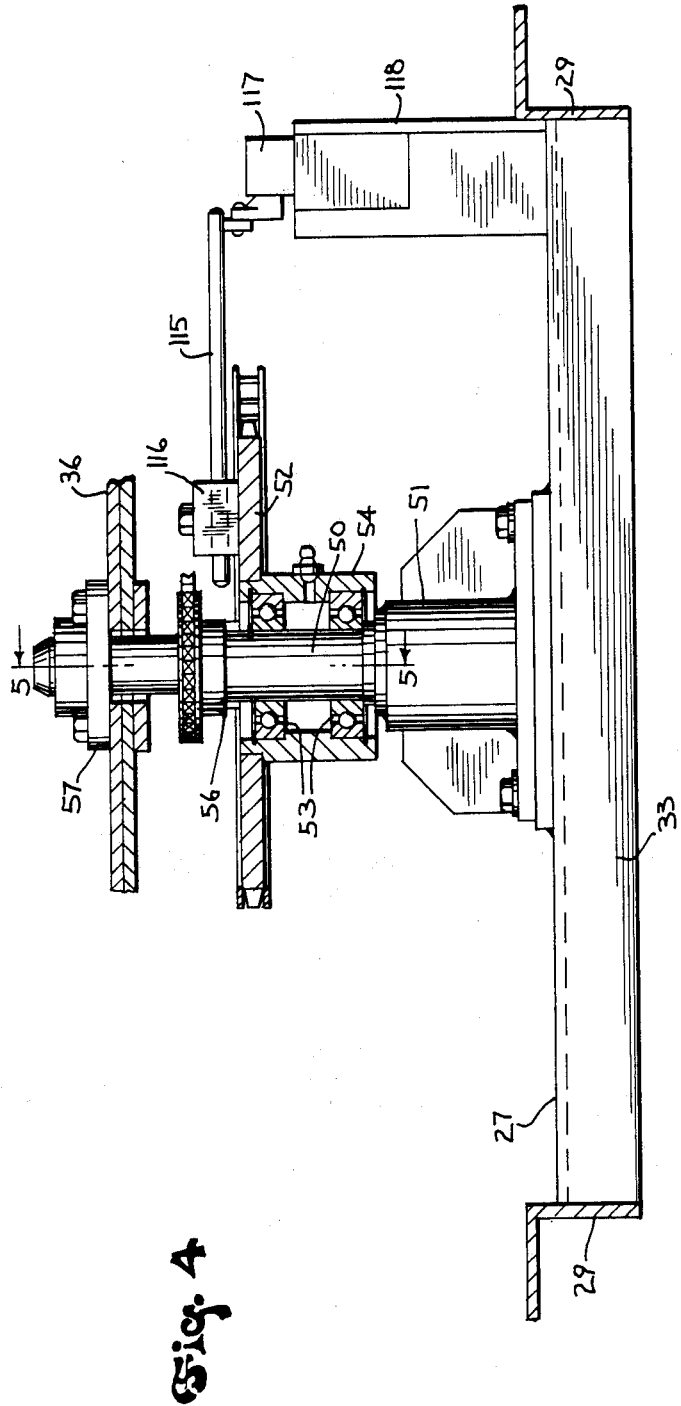
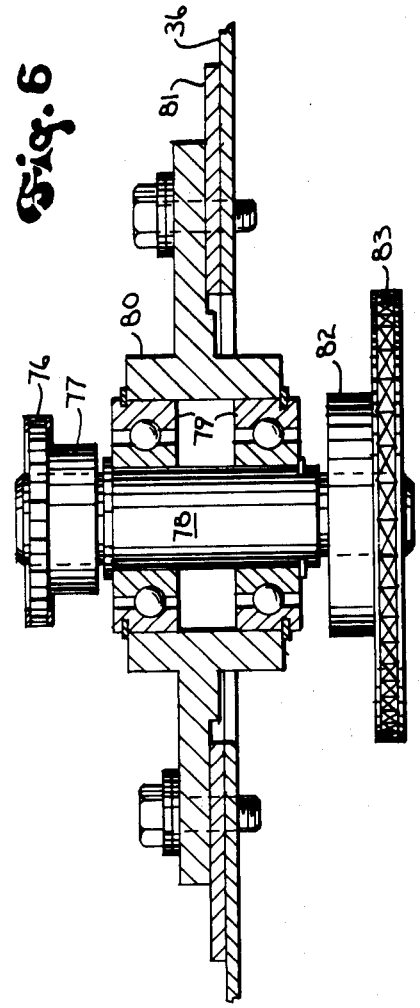
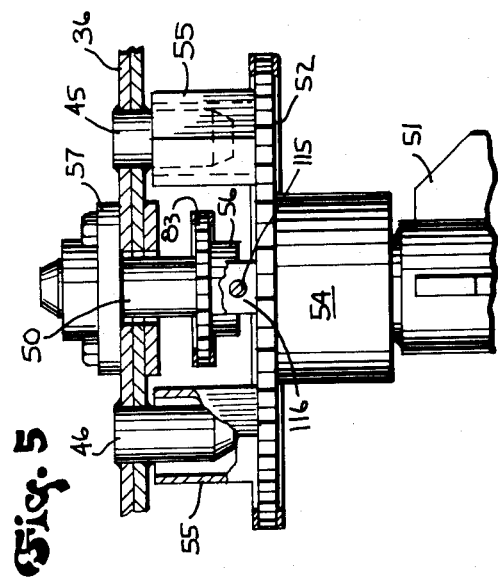

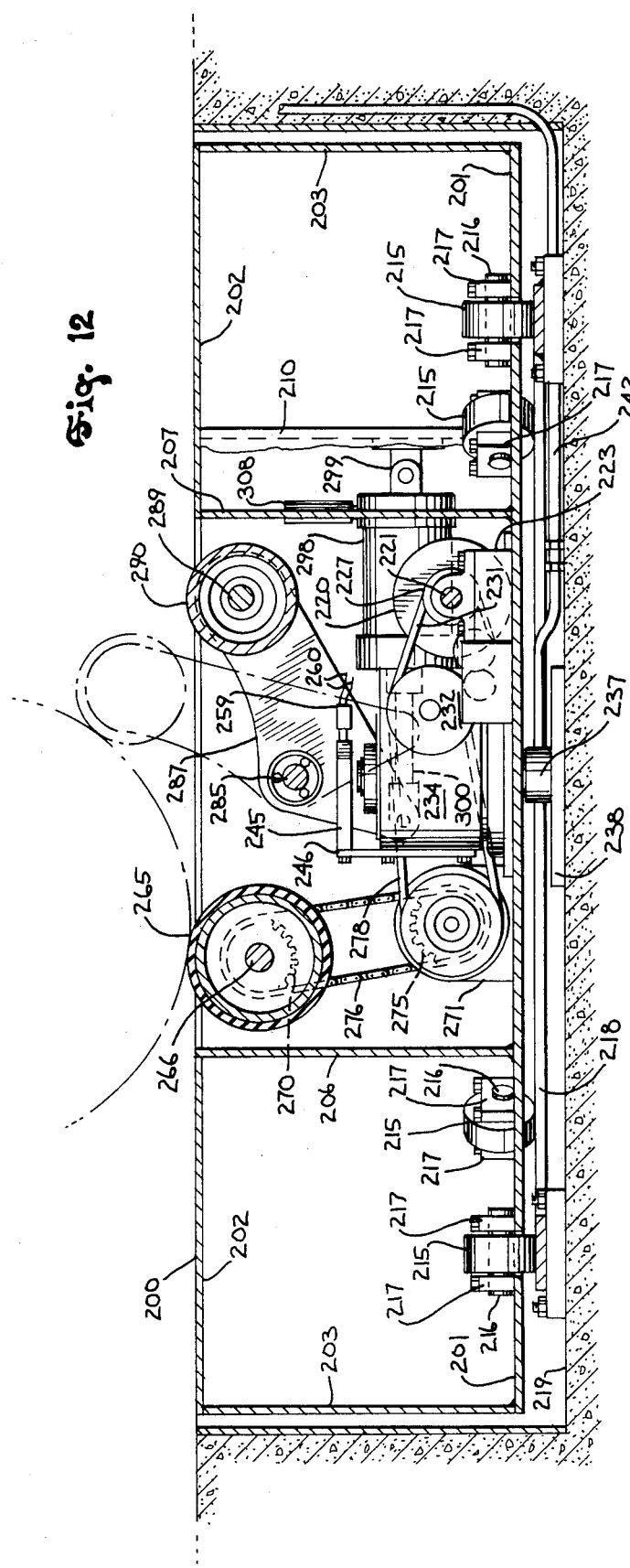
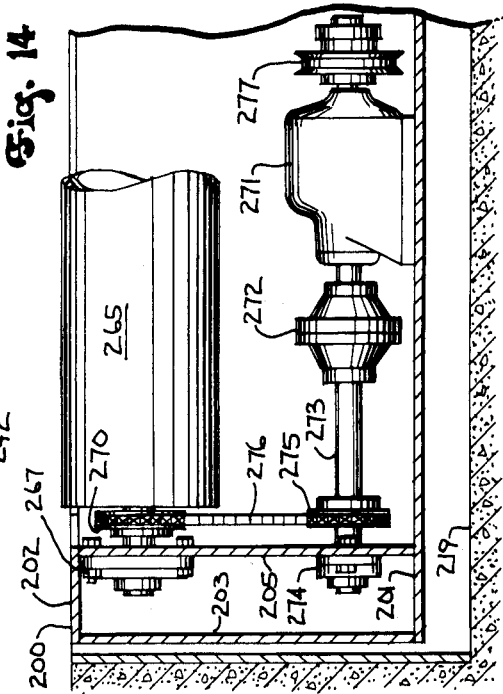
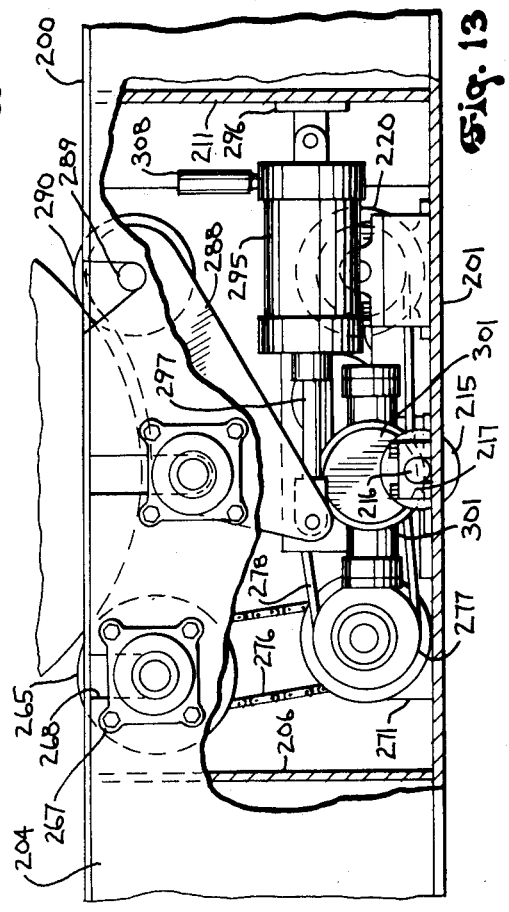

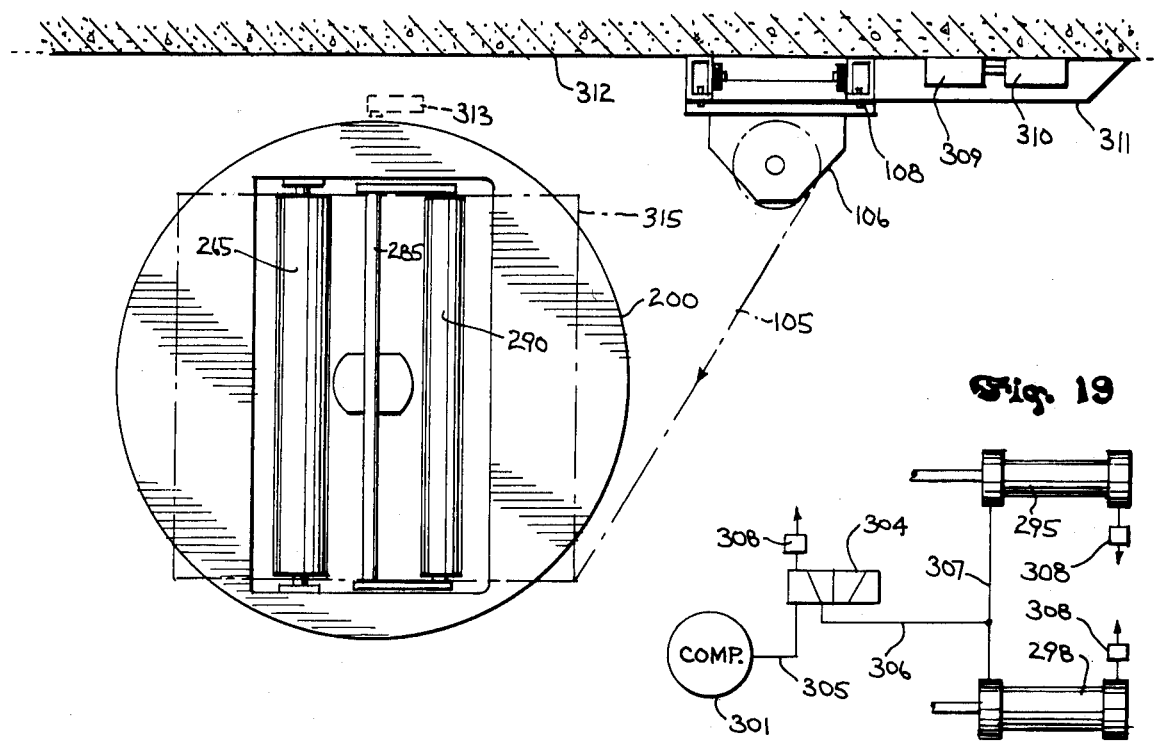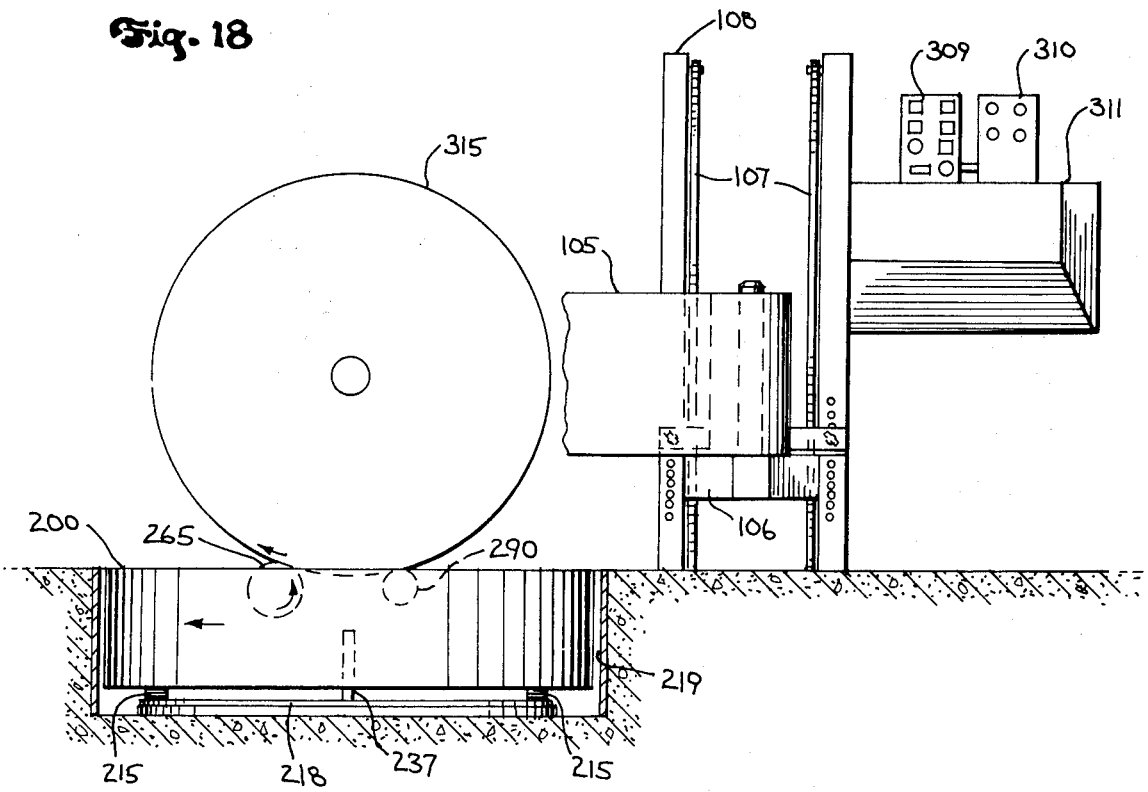

WRAPPING APPARATUS AND METHOD

TECHNICAL FIELD

This invention relates to wrapping apparatus and a method for the application of wrapping material about the entire outer surface of an object.

BACKGROUND ART

Paper mills produce large rolls of paper and other paper products that often are 50" in diameter, 50" wide and weigh 500 lbs. or more, and even larger, which require protection against dirt, moisture and physical damage during warehousing, internal use as when a roll is moved to areas for converting, and transport of finished rolls to customers.

One of the common present methods of wrapping such rolls is to wind wrapping material (plastic or paper) about the curved side surface of the roll. Wrapping machines are available commercially which perform this function by holding the roll either horizontally or vertically and rotating it about its axis. This general type of apparatus is also shown in U.S. Pat. Nos. 1,570,266; 3,863,425; 3,514,920; 4,050,221; and 4,077,179. Such machines, however, are able to wrap only the curved side surface of the roll; separate end cap pieces must be placed over each end of the roll in order to complete the wrapping enclosure. This method of wrapping a large roll is time consuming as it requires a number of separate operations and extra man hours, and it fails to provide the desired level of protection for the roll. The equipment required is quite large and takes up considerable floor space. Often two machines are necessary, one to wrap the roll and another to crimp and position the end cap pieces. Several supply rolls of wrapping paper, each carried on individual unwind stands, of various widths are needed in order to properly wrap individual rolls of different lengths (i.e. paper of different widths). The equipment also normaly requires the application of two end cap pieces, the first being applied before the wrapper is crimped around the ends of the roll, and the second being applied after the wrapper has been crimped. In order to promote machine efficiency, it is likely that a number of rolls of similar widths would be accumulated in a surge area and then wrapped at one time. The net result is excessive damage to the product and a relativey high cost of wrapping.

Another presently known method for wrapping such rolls is to use a large plastic bag. This method also is time consuming in its manpower requirements and suffers the further disadvantage of being able to provide only a loosely-fitting wrapper. The loose wrapper can be easily punctured or torn and it fails to provide adequate protection for the roll.

The problem of effective and efficient wrapping of large rolls of paper, paperboard and tissue still exists in the paper industry. It is also present in other fields, such as the manufacture of textiles or building materials, in which large diameter cylindrical objects require protective wrapping. Thus there remains a need for a low cost system for wrapping large diameter cylindrical objects in a manner which will provide effective product protection in view of the deficiencies of the prior art systems discussed above.

DISCLOSURE OF THE INVENTION

The stimulus for our present invention was the inability of commercially available wrapping equipment to tightly wrap both the side surface and end surfaces of a large roll of paper or similar object.

Our new wrapping method involves the steps of attaching a web of wrapping material to an object to be wrapped, and then rotating the object about a first axis of rotation and simultaneously rotating the object about a second axis of rotation intersecting and angularly displaced from the first axis of rotation to cover all surfaces of the object with the wrapping material. In a specific method for wrapping a cylindrical object such as a roll of paper, the object is rotated about its longitudinal axis and simultaneously rotated about a second axis perpendicular thereto, and the object is covered with a plurality of overlapped rows of wrapping material about its end and curved peripheral surfaces. Thus the roll is biaxially rotated, e.g. combining rotation about its longitudinal axis with rotation about another axis, to thereby provide for completely covering all surfaces of the roll with a single length of wrapping material.

Our new apparatus includes means for rotating an object to be wrapped about a first axis of rotation and means for rotating the object about a second axis of rotation intersecting and angularly displaced from the first axis, both of said means being adapted to operate simultaneously. Apparatus specifically adapted for wrapping cylindrical objects such as a roll of paper includes means for rotating the roll about its longitudinal axis and means for rotating the roll about a vertical axis, both of said means being adapted to operate simultaneously, whereby wrapping material can be wound about all surfaces of the roll to effect complete enwrapment thereof.

We developed our present invention in order to attain a number of important objectives, some of which are as follows. We desired to provide rapid and effective wrapping of large diameter objects, such as rolls of paper products weighing hundreds of pounds. We sought to provide a method and apparatus for completely wrapping large-sized objects, particularly large cylindrical objects, with a single length of wrapping material to obviate the need for using three-part systems employing a wrapper for the curved side of the object and separate headers to cover the ends. We also sought to develop a system for completely wrapping a large object in a manner in which the wrapping material would closely conform to all of its surfaces. Further, we wanted to provide wrapping appartus capable of wrapping a large object as described above that can be made as an attachment to commercially available wrapping machines, but we also desired to provide an integrated apparatus particularly designed for the practice of our new wrapping method.

BRIEF DESCRIPTION OF THE DRAWINGS

In the Drawings:

FIG. 4 is a vertical sectional view of a portion of the apparatus taken along the plane of line 4—4 of FIG. 2;

FIG. 5 is a vertical sectional view of a portion of the apparatus taken along the plane of line 5—5 of FIG. 4;

FIG. 6 is a vertical sectional view of a portion of the apparatus taken along the plane of line 6—6 of FIG. 3;

FIG. 12 is a vertical sectional view taken along the plane of line 12—12 of FIG. 11;

FIG. 13 is a partial vertical sectional view taken along the plane of line 13—13 of FIG. 11;

FIG. 14 is a partial sectional view taken along the plane of line 14—14 of FIG. 11;

FIG. 17 is a top view showing the apparatus of the second embodiment as installed in a factory area;

FIG. 18 is a side view of the installation of FIG. 17; and

FIG. 19 is a schematic illustration of the pneumatic circuit associated with the apparatus of FIG. 11.

A. GENERAL OPERATION (FIGS. 1A–1G)

Figure 1A:
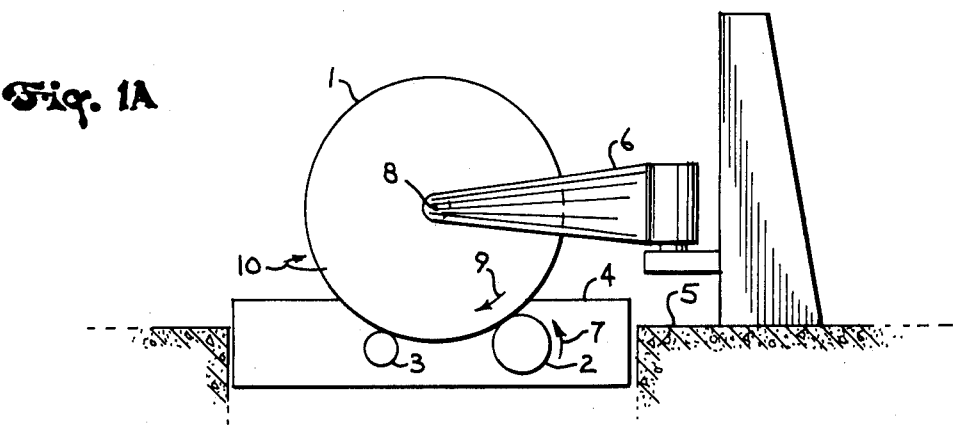
FIGS. 1A–1G are schematic views to illustrate the general principles of our present wrapping method and apparatus.
Figure 1B:
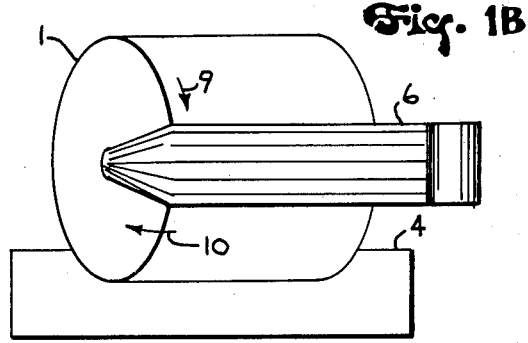
Figure 1C:
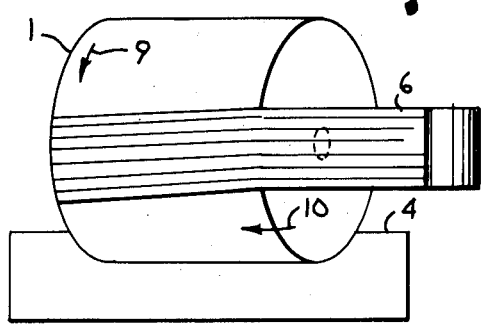
Figure 1D:
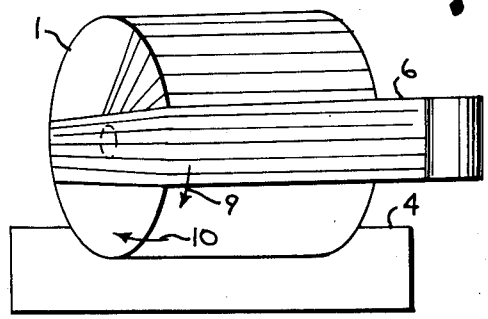

The basic concepts of the wrapping apparatus and method of our present invention are illustrated schematically in FIGS. 1A–1G. A roll 1 which is to be wrapped is supported between a drive roll 2 and an idler roll 3. The drive roll and idler roll are carried on a turntable 4 which is adapted to rotate in the plane of the floor 5. Wrapping material 6 is unwound from a supply roll thereof and its free end is attached to the core of the roll 1. The turntable 4 is driven to rotate in a plane parallel to the floor to thereby cause the longitudinal axis of the roll 1 to be rotated as indicated by the arrow 10; when the turntable is supported along the floor as shown, the longitudinal axis 8 of the roll will rotate in a horizontal plane. Thus the roll 1 will be rotated end-for-end. Simultaneously, the drive roll 2 is driven to rotate in the direction of the arrow 7 which causes the roll 1 to rotate about its longitudinal axis 8 in the direction shown by the arrow 9.

Figure 1E:
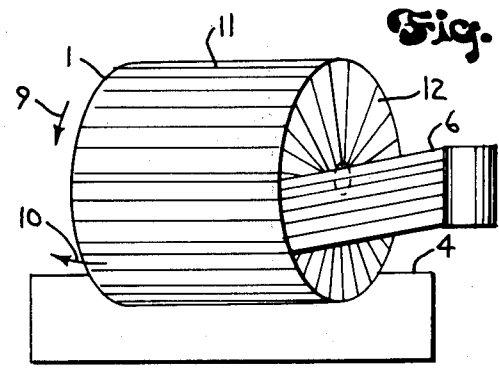
Figure 1F:
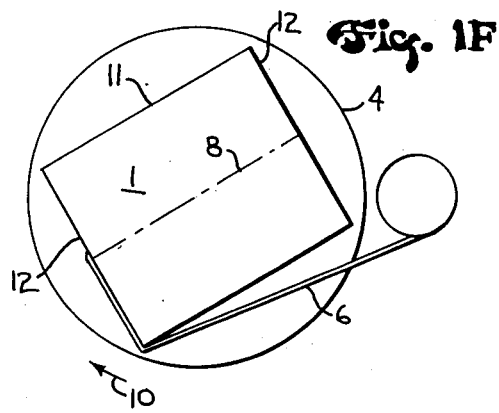
Figure 1G:
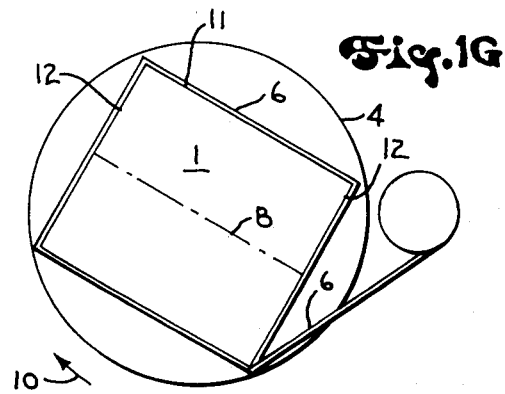

The foregoing simultaneous dual rotation of the roll 1 which is to be wrapped will cause the wrapping material 6 to be wrapped about the roll in a generally spiral configuration with overlapping layers as shown by the sequential views of FIGS. 1B–1E. When the wrapping is completed, the wrapping material will completely surround the surfaces of the roll including its curved side surface 11 and end surfaces 12 as indicated in FIG. 1E. The top views of FIGS. 1F and 1G show the rotation of the turntable 4 and the manner in which the longitudinal axis of the roll 1 is thereby rotated end-for-end, i.e in a plane parallel to the floor, in the direction of the arrow 10. FIG. 1G also illustrates the manner in which the wrapping material 6 encloses the curved side surface 11 and both end surfaces 12 of the roll.

The present invention, in both its apparatus and method aspects, thus provides a tight protective wrapping for a roll consisting of a spiral overlap of wrapping material on all roll surfaces; this eliminates the need for other wrapping materials to cover the ends of the roll. A tight full wrapper is applied about the roll in a manner which will protect the roll from dirt, moisture and handling damage.

B. DESCRIPTION OF FIRST EMBODIMENT (FIGS. 2–10)

The first embodiment of apparatus according to this invention is shown in FIGS. 2–10. This version is particularly appropriate for attachment to existing wrapping equipment to provide a new apparatus for the practice of our wrapping method. In the ensuing description, the apparatus is divided into several component parts to more clearly explain its structure and operation.

(1) SUPPORT STRUCTURE

Figure 2:
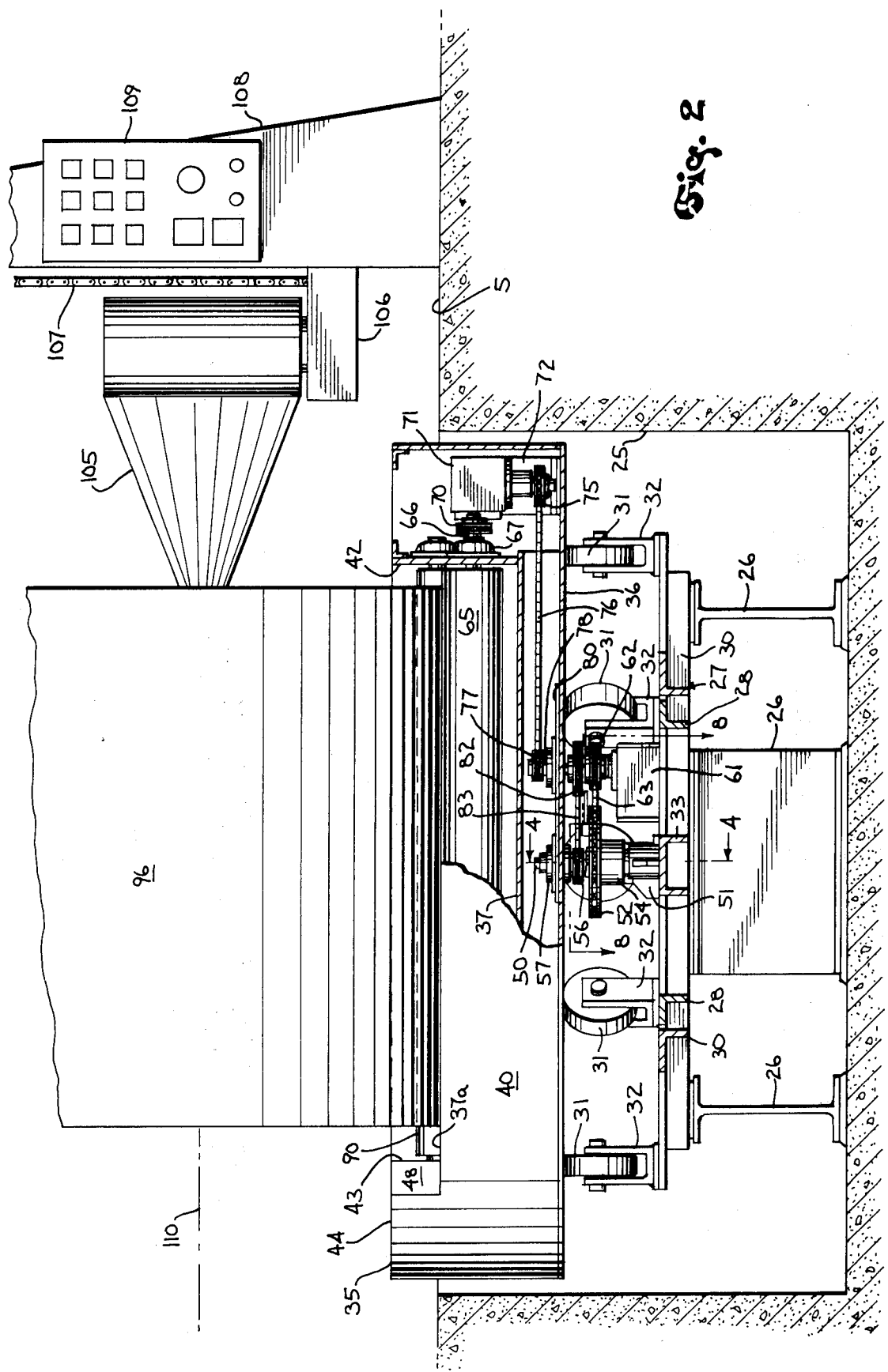
FIG. 2 is a side view of an apparatus according to our present invention.

Referring first to FIG. 2, a pit 25 is dug in the floor to receive the apparatus. A set of four I-beams 26 are fixed into position on the bottom of the pit and arranged in a rectangular fashion. A frame 27 is attached to the tops of the I-beams.

Figure 3:
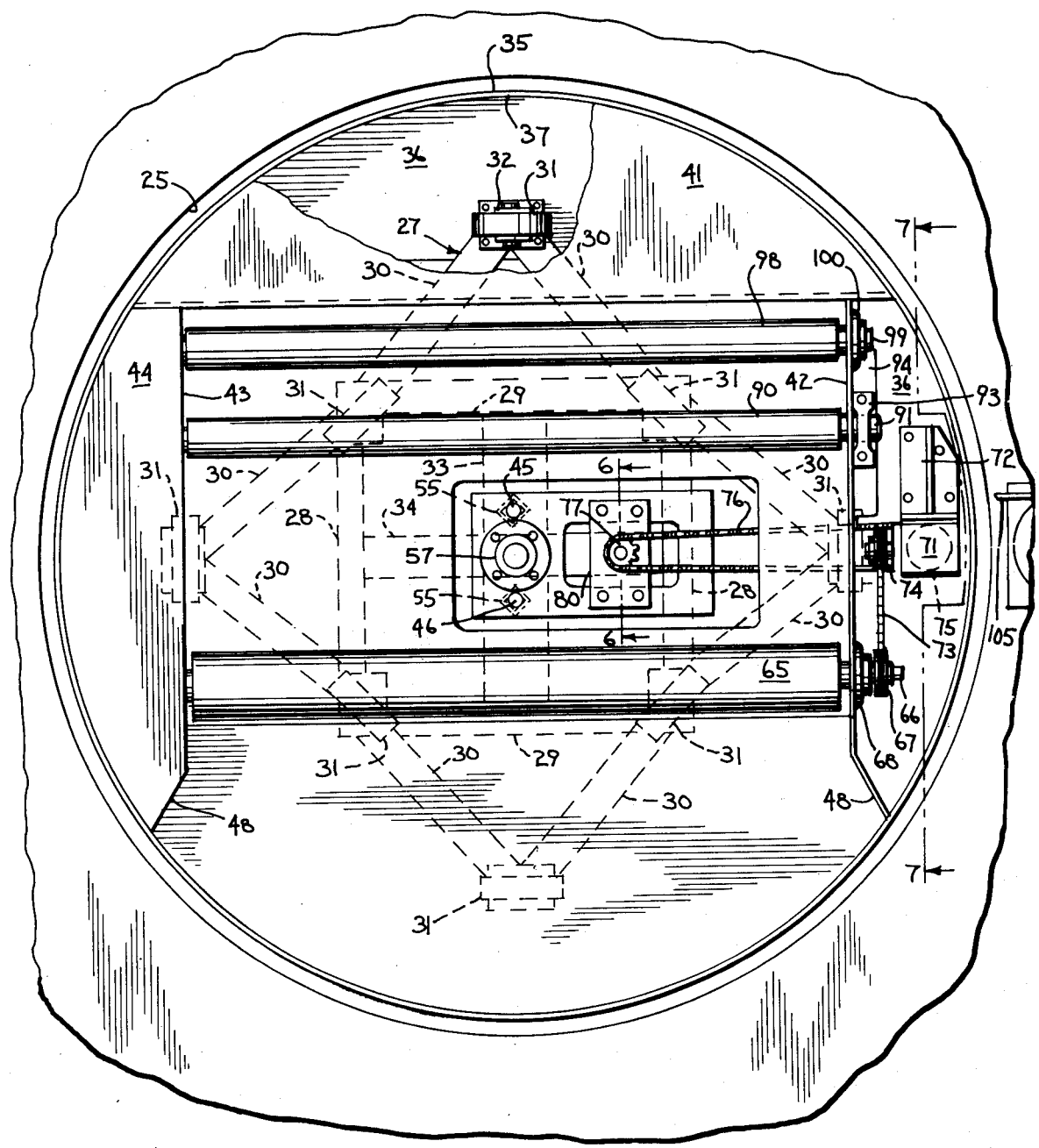
FIG. 3 is a top view of the apparatus of FIG. 2.

The frame 27 includes a number of angle-iron members joined together as best shown in the top view of FIG. 3. Side frame members 28 are joined to end frame members 29 to form a square frame unit. Two outrigger frame members 30 are attached to each side of the square frame unit and extend therefrom in a V-configuration as indicated in the drawing with their outer ends joined to each other. Casters 31 are journaled in U-brackets 32 which are attached to the frame 27. One caster is located at the intersection of each side member 28 and end frame 29, and one caster is located at the outer intersection of each pair of outrigger frame members 30. A central frame member 33 extends between the end frame members 29, and central frame members 34 extend between the side frame members 28.

It should be pointed out, however, that apparatus according to the present invention need not be installed in a pit but, instead, can be installed at various heights. For example, the equipment can be mounted on the floor and a lift used to hoist rolls onto the equipment and to remove the rolls after the wrapping has been completed. The equipment can be constructed to match the discharge level of a rewinder so that the rolls can merely roll along the same vertical plane from the rewinder onto the wrapping apparatus, and then be removed with a lift or elevator to floor level after the wrapping operation has been completed. Also, the wrapping apparatus can be associated with delivery conveyors which either feed rolls to the apparatus for wrapping or convey wrapped rolls from the apparatus to a warehouse, or both.

(2) TURNTABLE

Figure 9:
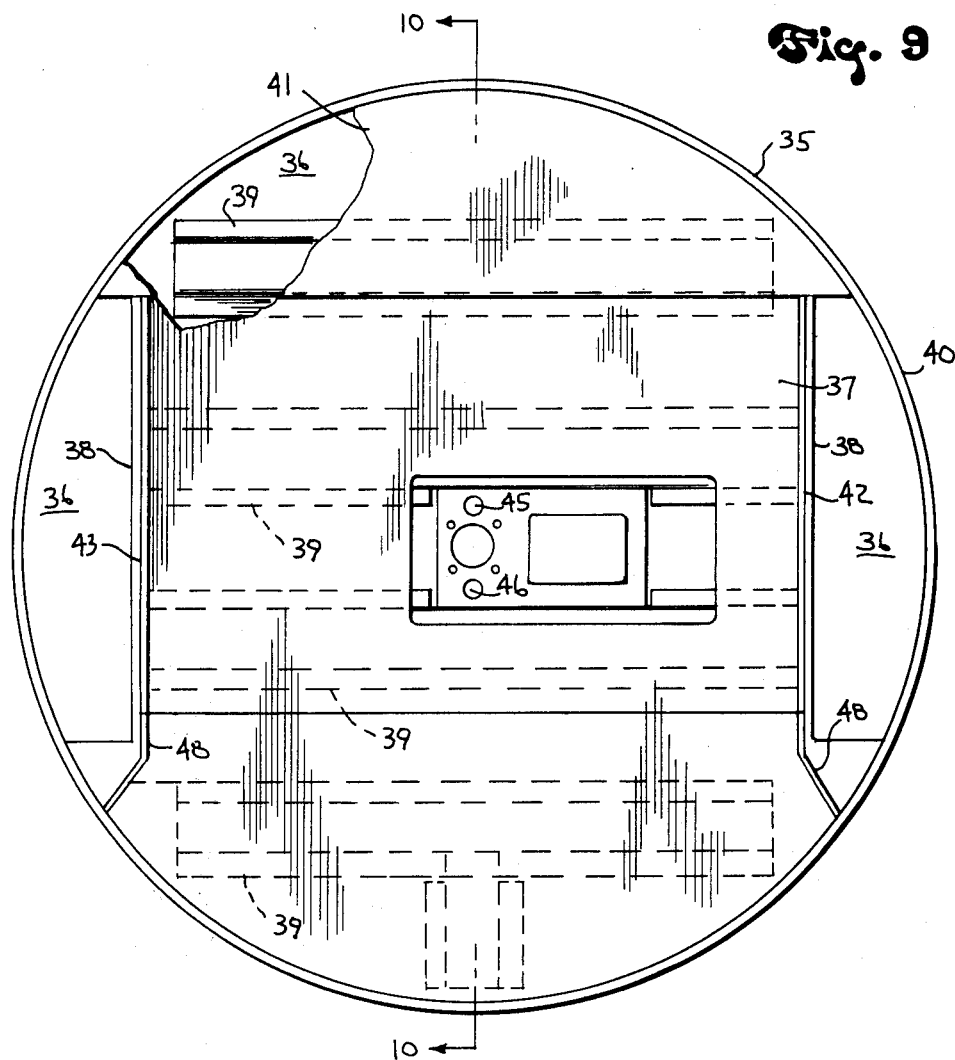
FIG. 9 is a top view of the turntable employed with the apparatus of the previous Figs.
Figure 10:
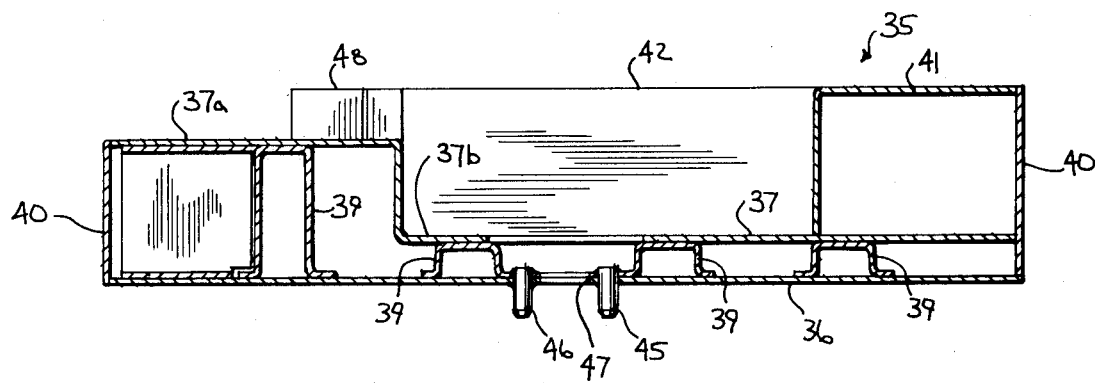
FIG. 10 is a vertical sectional view along the plane of line 10—10 of FIG. 9.
Figure 11:
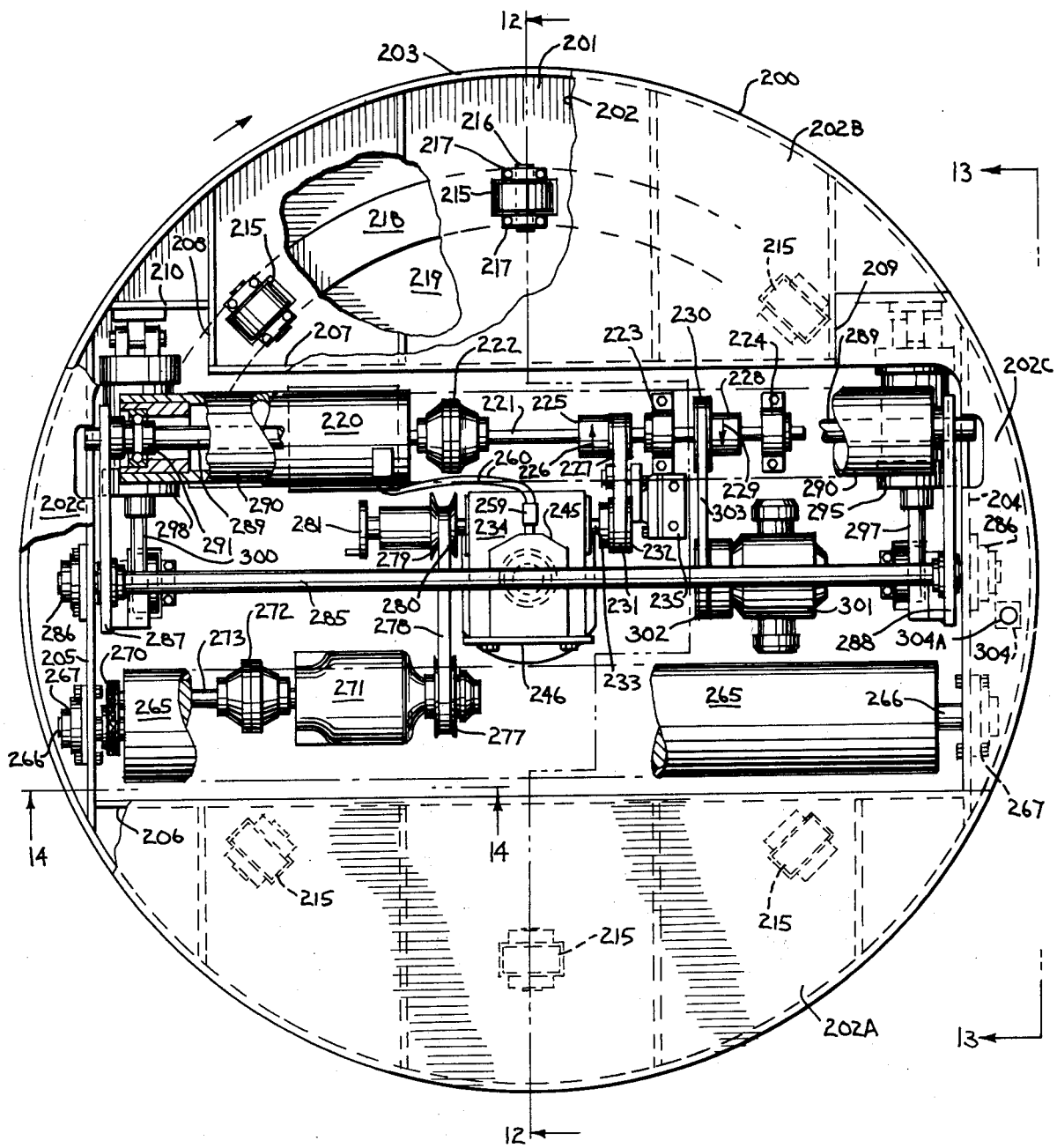
FIG. 11 is a top view of a second apparatus according to our present invention.

As best illustrated in FIGS. 9 and 10, the turntable 35 comprises a round table base 36 and a table top 37 having a pair of spaced straight edge portions 38. The table top 37 is bent as shown in FIG. 10 to have a front portion 37a that is raised with respect to its rear portion 37b. The table top 37 is secured to and spaced from the table base 36 by means of a plurality of channels 39. A circular side wall 40 surrounds the periphery of the turntable and is somewhat higher at the rear than at the front of the turntable. Rear cover 41 is connected between the upper edge of the side wall 40 and the table top 37. Straight side walls 42 and 43 are attached to the table top 37 at each straight edge portion 38 thereof; only the righthand side wall 42 is shown in FIG. 9, but both side walls 42 and 43 are depicted in FIG. 3. A cover 44 is positioned to cover the space between each side wall 42 and 43 and their respective adjacent portions of the circular side wall 40; one cover 44 is shown in place with respect to side wall 43 but omitted with respect to side wall 42 in FIGS. 2 and 3. Locating pins 45 and 46 are attached to the table base 36, the pins being equally spaced from the center of the base about a central aperture 47. Wings 48 (see also FIGS. 3 and 7) are attached to the front end of each side wall 42 and 43 to define an entrance along the front portion 37a of the table top.

(3) TURNTABLE DRIVE

Figure 8:
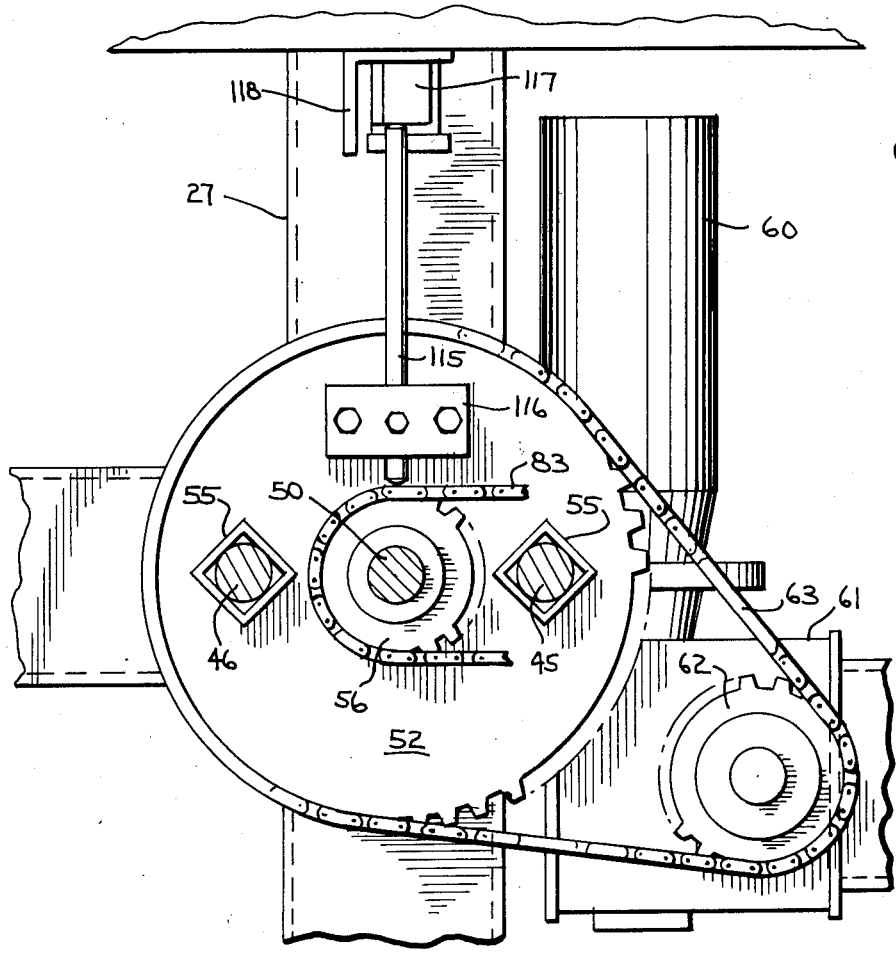
FIG. 8 is a partial top view showing the main drive of the apparatus.

Turning now to FIG. 4, a vertical stationary pedestal shaft 50 is mounted in a support 51 that is attached to the central member 33 of the frame 27. Drive sprocket 52 is journaled about the pedestal shaft along bearings 53 positioned between the hub 54 of the sprocket and the pedestal shaft 50. The drive sprocket 52 carries a pair of square tube sockets 55 which are best seen in FIGS. 5 and 8. A power take-off sprocket 56 is keyed to the pedestal shaft 50 above the drive sprocket 52, the bottom of the hub of the sprocket 56 engaging a shoulder formed in the pedestal shaft.

The turntable 35 when installed in its operating position as in FIG. 2 is supported on the casters 31, with the table base 36 resting on the casters and the front portion 37a of the table top 37 positioned at approximately floor level. The locating pins 45 and 46 which depend from the table base 36 are received in the sockets 55 carried on the drive sprocket 52 as best shown in FIGS. 3 and 5. The central aperture 47 in the table base fits about the pedestal shaft 50, and a bearing 57 is attached to the table base to surround the pedestal shaft.

The turntable 35 will turn about the stationary pedestal shaft 50 when the drive sprocket 52 is rotated. The drive for the sprocket 52 (FIG. 8) comprises an electric motor 60 attached to the frame 27 which has its output shaft connected to a right angle drive 61 having an output sprocket 62, which may include a torque limiter hub for mechanical protection. Chain 63 is trained about the output sprocket 62 and the drive sprocket 52 to rotate the sprocket 52 upon actuation of the motor.

(4) DRIVE ROLL AND ITS DRIVE; IDLER ROLL

Drive roll 65 (FIGS. 2 and 3) is carried on a shaft 66 that is journaled in bearings 67 attached to the vertical side walls 42 and 43 of the turntable, the drive roll extending across most of the space between the side walls. The ends of the shaft 66 each extend through a slot 68 (FIG. 7) formed in both side walls 42 and 43 so that the drive roll can be easily installed and removed, and a keeper plate 69 is attached to the side wall to close the slot after the shaft is in place.

Figure 7:
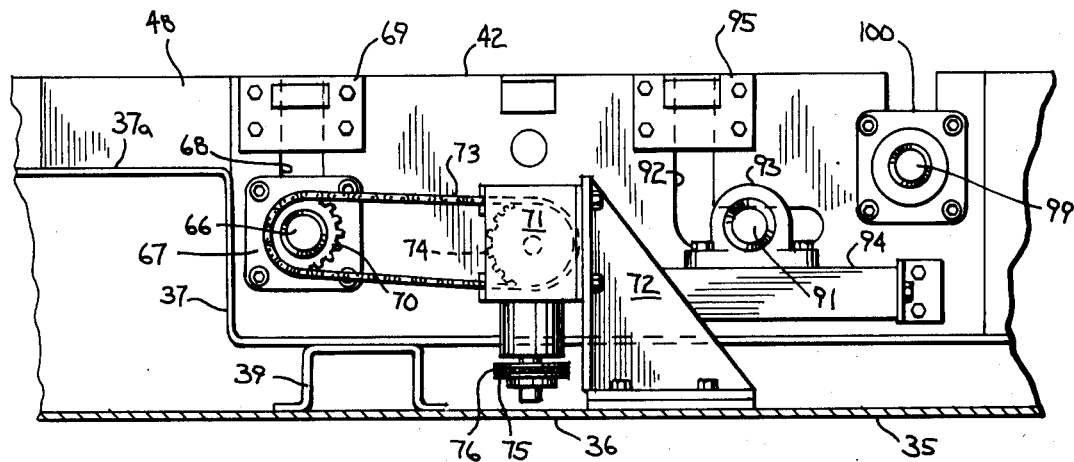
FIG. 7 is a vertical sectional view of a portion of the apparatus taken along the plane of line 7—7 of FIG. 3.

The drive for the drive roll 65 is best seen in FIGS. 3 and 7. A sprocket 70 is keyed to the end of shaft 66 outboard of vertical side wall 42. Right angle drive 71 is attached to bracket 72 which is fastened to the base 36 of the turntable. Chain 73 connects the output sprocket 74 of the right angle drive 71 with sprocket 70 for rotation of the drive roll 65. Input sprocket 75 of the right angle drive 71 is drivingly connected through chain 76 to sprocket 77.

Turning now to FIG. 6, the sprocket 77 is keyed to stub shaft 78 which is journaled in bearings 79 carried on plate 80. The plate 80 is bolted to the base 36 of the turntable, with a reinforcing plate 81 between the base 36 and plate 80. The plate 80 is bolted through slotted holes to allow for sufficient sliding movement to allow setting the proper tension in chain 76. Sprocket 82 is keyed to the end of stub shaft 78 opposite from the sprocket 77. Chain 83 drivingly connects sprocket 82 with the power take-off sprocket 56 keyed to the pedestal shaft 52, see especially FIGS. 2, 5 and 6.

Idler roll 90 is carried on shaft 91, and the ends of the shaft extend through slots 92 formed in vertical side walls 42 and 43 (FIG. 7). The ends of the shaft 91 are journaled in bearings 93 which are carried on a threaded rod (not shown) enclosed in housing 94 to provide for sideways adjustment in the position of the idler roll 90. A keeper plate 95 closes the top of each slot 92 after the shaft 91 has been inserted into position.

Turning to FIG. 3, the drive roll 65 and the idler roll 90 are positioned on opposite sides of the center of the turntable 35. The drive roll and idler roll form a cradle to support a cylindrical object which is to be wrapped, a roll of paper 96 being illustrated in such position in FIG. 2.

Turning again to FIG. 3, an auxiliary idler roll 98 may also be positioned between side walls 42 and 43 with the ends of its shaft 99 journaled in bearings 100 attached to each of the side walls (FIG. 7). It has been found that one drive roll and one idler roll will form a suitable cradle for the apparatus of the present invention. The auxiliary idler roll is an optional element which acts as a stop in case the roll to be wrapped should roll past the first idler roll.

(5) WRAPPING MATERIAL SUPPLY

A supply roll of wrapping material 105 is supported on a carriage 106 which is carried for vertical positioning on a pair of chains 107, only one of which is visible in FIG. 2. The chains are supported in a housing 108.

A suitable device, not shown, for applying tension to the supply roll of wrapping material in an amount appropriate to the wrapping material being used and the horizontal rotation speed of the roll to be wrapped is located within the carriage 106; tension control equipment of this type is standard on most wrapping machines, and an electric brake is generally employed for such purpose. The tension device would be electrically connected to control panel 109 in order to enable variable setting of the tension. The control panel 109 encloses the various switches to control operation of the several elements of the apparatus, including rotation of the turntable 35, adjustment of the tension applied to the wrapping material, and vertical positioning of the carriage 106. Web supply apparatus of this type is well known to the art and a number of manufacturers make appropriate equipment, so that a detailed description is not presented herein.

Bar 115 is supported in a block 116 attached to the drive sprocket 52, see especially FIGS. 4 and 8. The outer end of the bar 115 contacts a switch 117 supported on a bracket 118 attached to the frame 27. The bar 115 contacts the switch after each revolution of the turntable 35; the switch 117 is suitably connected to the control panel 109 in the usual manner so that the operator can select the number of turntable revolutions for each wrapping cycle.

(6) OPERATION

Referring now to FIG. 2, the general operation of the apparatus illustrated in FIGS. 2–10 will be described.

A roll 96 of paper, or other appropriate object, is rolled into place on the turntable to be cradled between the drive roll 65 and the idler roll 90. The end of the web of wrapping material 105 is withdrawn from the supply roll in a vertical position relative to the floor and tucked into the core of the roll 96; if desired the end of the wrapping material can be attached by means of glue, adhesive tape, staples, etc. Upon actuation of a power supply switch on control panel 109, power is supplied to the electric motor 60 which, through the right angle drive 61, causes rotation of drive sprocket 52 which rotates the turntable in a horizontal plane, i.e. parallel to the plane of the floor 5. Simultaneously, through the chain 83 connected between the power take-off sprocket 56 on the stationary pedestal shaft 50, and sprocket 82 carried on stub shaft 78, sprocket 77 will rotate and thereby cause rotation of the right angle drive 71 through its connection therewith by chain 76; this causes the drive roll 65 to be rotated. The drive roll 65 bears against the outer periphery or curved side surface of the roll 96 and causes the roll to rotate about its longitudinal axis 110. Thus the roll 96 is rotated about its longitudinal axis 110 while being simultaneously rotated end-for-end in a horizontal plane. The wrapping material 105 thereby is wrapped in a spiral fashion to cover both the curved side surface of the roll 96 and its ends so that the roll will be completely covered by the wrapping material in the manner illustrated in FIGS. 1B–1G. It has been our experience that when the end of the web of wrapping material is tucked into the core of the roll, approximately the first two revolutions should be made with little or no tension applied to the web of wrapping material, after which the final selected tension can be applied; this is not necessary if the end of the wrapping material is attached to the roll with adhesive or tape.

One or more layers of the wrapping film can be applied about the roll in this fashion, as desired; when wrapping large heavy rolls of paper, it has been found that a two-layer wrap is particularly effective to assure protection of the roll.

The gear ratio of the drive 61, the sizes of the various sprockets which drive the turntable 35 and the drive roll 65, and the gear ratio of the drive 71 are each selected to provide the desired relationship between the revolutions of the turntable and the rotations of the roll 96 about its longitudinal axis. In a specific example involving the use of the apparatus to apply a 24" wide web of wrapping material about a 50" diameter roll of paper, these elements were selected so as to rotate the roll 360 degrees about its longitudinal axis while the turntable was turned 9 revolutions; this provided two layers of wrapping material spirally wound about the roll, with 12" of overlap between adjacent wraps of wrapping material. The gear drives and sprockets can be approximately sized to achieve other configurations of the final enwrapment both as to the number of layers and the degree of overlap.

After the roll 96 has been completely covered with the desired number of layers of wrapping material, the web of wrapping material is severed and the loose end may be tucked under one of the spirally-wound layers of material. Also, if desired, the loose end of wrapping material can be glued, taped, or otherwise fastened to the wrapped roll. The wrapped roll can be removed from the turntable by various means. Thus, it can be manually rolled off the turntable across the front portion 37a thereof if it is not too large. The wrapped roll also can be removed by a fork lift truck or suitable chain hoist apparatus. Another means which has been found effective in the use of the wrapping apparatus of this invention is to mount a roll ejector on the floor behind the turntable which includes a pneumatic cylinder of sufficient stroke length to contact the wrapped roll and push it out of the cradle between the drive roll and idler roll. The ejector can be cycled by a manual switch, or it can be actuated by a limit switch tied into the roll wrap counter which shuts off the power to the turntable drive when the selected number of turntable revolutions has been completed.

(C) Description of Second Embodiment (FIGS. 11–19)

A second form of apparatus in accordance with our invention is illustrated in FIGS. 11–19. This embodiment is principally intended as an integrated unit adapted for use with various types of wrapping material supply equipment, and it is also designed to have minimum space requirements.

(1) Turntable and Support Structure

The turntable 200 (FIGS. 11–14) includes a circular base 201, a circular cover 202 having a rectangular central cut-out portion, and a circumferential wall 203. The cover member may be made in several sections such as front cover 202A, rear cover 202B and side covers 202C, bolted to vertical walls of the turntable so as to be removable for access. Straight side walls 204 and 205 are attached between the base and cover members near opposite sides of the turntable, and front wall 206 extends between the side walls 204 and 205. Rear wall 207 is attached to the base and extends to the cover as shown, and side walls 208 and 209 extend from opposite ends of the rear wall to the circumferential wall 203. Walls 210 and 211 are connected between the side walls 208 and 209, respectively, and the circumferential wall 203. A plurality of stiffening walls 212 are attached to the base and extend to the cover, the circumferential wall, and the front wall 206 or rear wall 207, as shown to provide further support to the turntable structure. A cover, not shown, can be used to enclose elements under the cut-out portion of the top to prevent injury to personnel and damage to machine elements.

A plurality of casters 215 (see especially FIG. 12) are journaled on shafts 216 which are supported in blocks 217 attached to the base 201 of the turntable. Each caster extends through an opening in the base 201 and rides along a circular raceway 218. The raceway is attached to the bottom of pit 219 in which the turntable is positioned, thereby providing for firm support of the turntable in the horizontal plane.

(2) Turntable Drive

Returning to FIG. 11, a reversible DC motor 220 is secured to the base 201 of the turntable and its output shaft 221, including coupling 222, is supported in spaced bearings 223 and 224 which are also secured to the base 201. A first overrunning clutch 225 that engages when the motor rotates in one direction only as indicated by arrow 226 is carried on the output shaft 221, and pulley 227 is driven by the clutch 225. A second overrunning clutch 228 is supported on the output shaft 221 and also engages when the motor rotates in one direction only, but in a direction opposite to that of the overrunning clutch 225 as indicated by the arrow 229; pulley 230 is attached to the second overrunning clutch 229. Thus, first overrunning clutch 225 is engaged to transmit torque and second overrunning clutch 228 is disengaged when the motor rotates the output shaft in the direction of arrow 225, whereas second overrunning clutch 228 is engaged to transmit torque and the first overrunning clutch 225 is disengaged when the motor 220 is reversed to drive the output shaft in the direction of arrow 229. A belt 231 connects between pulley 227 and pulley 232 that is carried on the input shaft 223 of a worm gear speed reducer 234. A belt tightener mechanism 235 is suitably positioned to enable adjustment of the tension in the belt 231. The speed reducer 234 is fastened to the base of the turntable.

The speed reducer 234 (FIG. 16) includes a hollow output shaft 236 that is driven by reduction gearing, not shown. The hollow output shaft 236 is keyed to a stationary center post 237 that is fixed to a plate 238 secured to the bottom of the pit 219, and the shaft 237 extends through a central aperture 239 formed in the base 201 of the turntable. When the speed reducer is driven by the motor 220, a drive gear (not shown) fastened to the hollow output shaft 236 rotates the shaft; since the output shaft 236 is keyed to stationary center post 237, the speed reducer 234 will rotate about the center post and thereby cause the turntable, to which the speed reducer is attached, to rotate.

Electrical power for the reversible motor 220 is furnished by means of power lines 240 and 241 (FIG. 16) that are fed through conduit 242 which extends along the bottom of pit 219; after leaving the conduit, the power lines pass through an axial aperture 243 extending upwardly through the stationary center post 237. The power lines are connected to a rotary contact 245 that is attached to bracket 246 fastened to one side of the speed reducer 234. The rotary contact includes a ring-like plastic body 247. Upper contact ring 248 and lower contact ring 249 are separated by a set of three spaced insulator discs 250 and retained between a top cover 251 and bottom cover 252 which are clamped between an annular inner shoulder 253 formed about the body 247 of the rotary contact. Power line 240 leads to the lower contact ring 249 and power line 241 leads to the upper contact ring 248.

Figure 15:
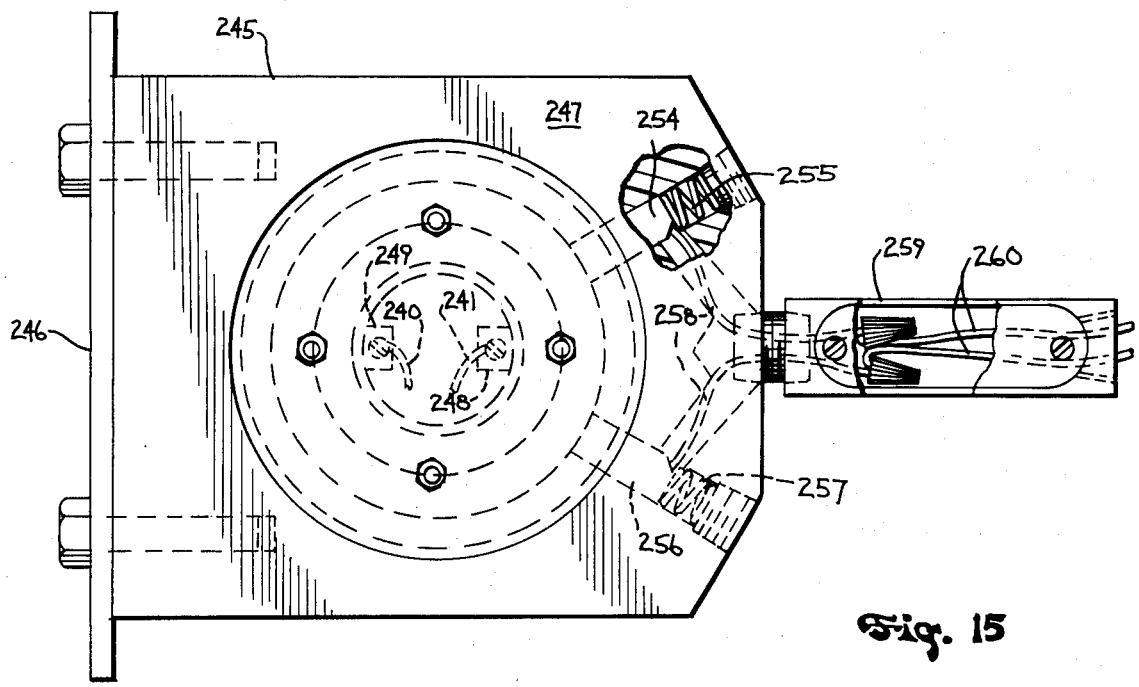
FIG. 15 is a partial top view illustrating the rotary contact employed with the apparatus of FIG. 11.
Figure 16:
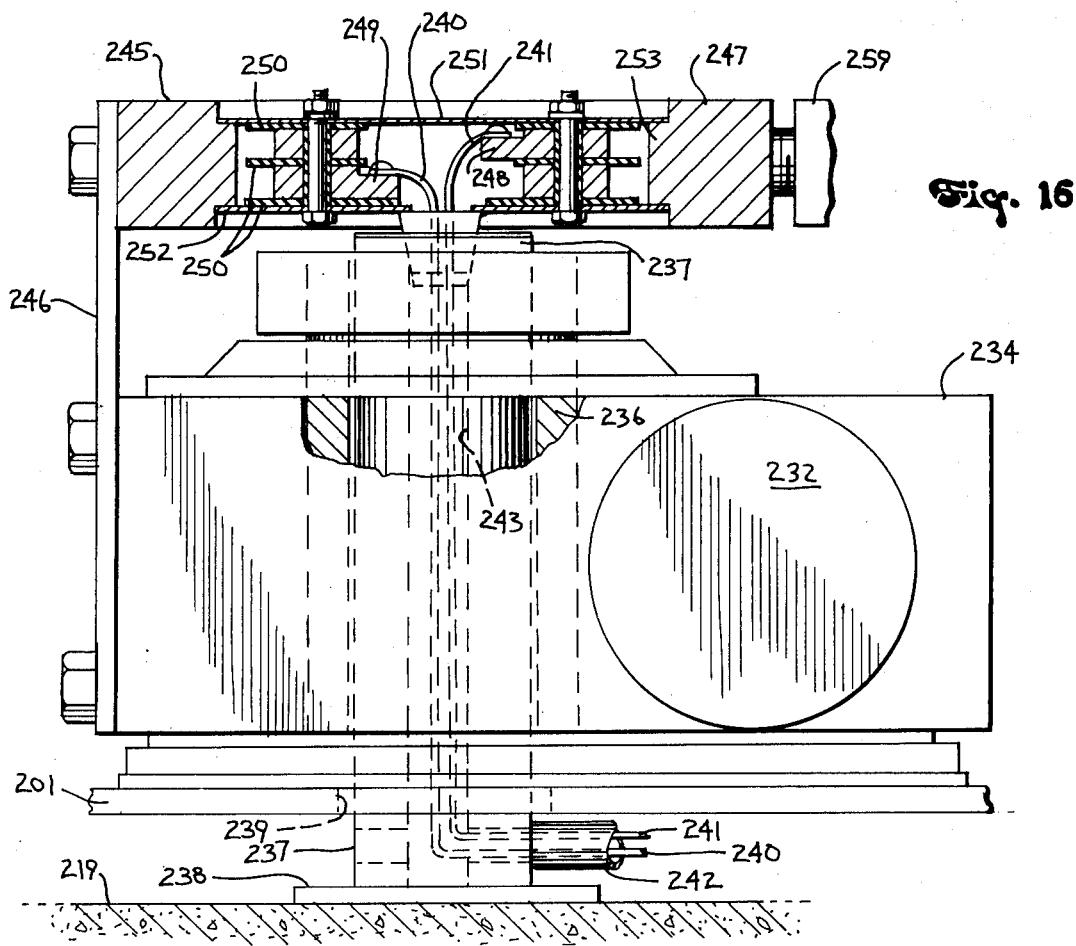
FIG. 16 is a side view, partially in section, showing the rotary contact of FIG. 15 and the speed reducer to which it is attached.

Turning now to FIG. 15, a contact brush 254 is positioned within a channel in the body 247 of the rotary contact and biased against the upper contact ring 248 by means of spring 255. Similarly, contact brush 256 is biased against lower contact ring 249 by means of spring 257. Power lines 258 are connected to the brushes 254 and 256 and lead to electrical fitting 259, where they are connected to power lines 260 that in turn lead to the electric motor 220 (FIG. 11) to furnish power for operating the motor.

(3) Drive Roll and Its Drive

Drive roll 265 (FIG. 11) is carried on shaft 266 that is journaled in bearings 267 attached to the straight side walls 204 and 205. The ends of the shaft 266 each extend through a slot 268 (FIG. 13) formed in the side walls 204 and 205.

Sprocket 270 (see particularly FIG. 14) is keyed to the end of shaft 266 near side wall 205. A planetary speed reducer 271 is fastened to the base 201 of the turntable and its output shaft is connected through coupling 272 to jack shaft 273. An end of the jack shaft 273 is journaled in bearing 274 supported in the side wall 205. Sprocket 275 is keyed to jack shaft 273 and connected by chain 276 to the sprocket 270 on the shaft 266 for the drive roll. At the input end to the speed reducer 271, pulley 277 is connected through belt 278 (FIG. 11) to pulley 279 keyed onto the shaft 280 extending from speed reducer 234. The opposite end of the pulley 279 is supported in bracket 281 secured to the base of the turntable. Upon operation of the speed reducer 234 when the motor 220 rotates its output shaft in direction of arrow 226, the drive roll 265 will rotate about the axis of its shaft 266.

(4) Idler Roll and Its Actuation

Returning to FIG. 11, pivot shaft 285 is journaled in bearings 286 which are fastened to the straight side walls 204 and 205 of the turntable. At the end of the pivot shaft nearest side wall 205, pivot arm 287 is attached to the shaft along its intermediate portion, as best illustrated in FIG. 12. At the opposite end of the pivot shaft nearest the wall 204, a similar pivot arm 288 is attached to the pivot shaft along its intermediate portion. An idler roll shaft 289 extends between opposed ends of pivot arms 287 and 288 and a hollow idler roll 290 is supported in bearings 291 which are carried near each end of the shaft 289.

A single acting air cylinder 295 (FIG. 13) has its cylinder end connected to bracket 296 which is attached to wall 211. The piston end 297 of the cylinder 295 is connected to the lower end portion of pivot arm 288. A similar air cylinder 298 (FIG. 12) is connected in the same manner to bracket 299 attached to side wall 210 and its piston 300 secured to the lower end portion of pivot arm 287. When air pressure is applied to the air cylinders 295 and 298, their respective pistons 297 and 300 are retracted to thereby partially rotate the pivot shaft 285 in a counterclockwise direction as viewed in FIG. 12 and raise the idler roll 290 to its upright position shown in dashed line, for the purpose as hereinafter described.

Compressed air for actuation of the cylinders 295 and 298 is supplied from air compressor 301 (FIG. 11) having a pulley 302 drivingly connected through belt 303 to the pulley 230 attached to the second overrunning clutch 228. The air compressor is actuated when the motor 220 is operated to drive its output shaft 221 in the direction of arrow 229. Movement of the pivot arms 287 and 288 is controlled upon the actuation of a three-way air valve 304. For the sake of clarity, the pneumatic lines are not shown in FIGS. 11-13 and a pneumatic circuit is diagrammatically illustrated in FIG. 19. Air line 305 connects the compressor 301 to the three-way valve 304, and air line 306 is connected to air line 307 for the supply of high pressure air to the air cylinders 295 and 298. Exhaust silencers 308 (see also FIGS. 12 & 13) may be attached to the air valve 304 and cylinders 295 and 298. The three-way air valve 304 is secured to the underside of the top 202 of the turntable and includes an operating button 304a (FIG. 11) that protrudes through the top so that it is convenient for an operator to actuate, such as by stepping on it, when it is desired to raise the idler roll to its upright position.

The idler roll 290 has a dual purpose of holding the object to be wrapped in a cradled position for proper contact with the drive roll 265 and also ejecting the wrapped object at the conclusion of the wrapping cycle. The idler roll is held in the down position as shown in full line in FIG. 12 during the wrapping cycle and its ejection position is shown in dashed line. After being raised to its ejection position, the idler roll will return to its down or wrapping position by gravity after the air is released from the cylinders 295 and 298. This return to a wrapping position can also be accomplished by a double-acting air cylinder if it is required to meet a quick and positive cycle demand.

(5) Wrapping Material Supply

FIGS. 17 and 18 illustrate the wrapping apparatus of the second embodiment in conjunction with means for supplying wrapping materials. As with the first embodiment of FIGS. 1–10, a supply roll of wrapping material 105 is supported on a carriage 106 which is carried for vertical positioning on a pair of chains 107. The chains are supported in a housing 108. A suitable device for applying tension to the entire roll of wrapping film, such as a brake, is associated with the carriage 106 to control the tension applied to the web of wrapping material. A control panel 309 encloses various switches to control the unwinding of wrapping material 105 from its supply roll and a control panel 310 includes the various switches for controlling the drive of the turntable 200, the control panels 309 and 310 being mounted on a base 311 which is attached to a wall 312 as illustrated in FIG. 17. The housing 108 carrying the chains and carriage is secured to the same wall 312. A revolution counting switch 313 is supported in part of the pit 219 and arranged to count the number of revolutions of the turntable 200 so that the operator can control the number of turntable revolutions for each wrapping cycle.

(6) Operation

A roll 315 of paper, or other appropriate object, is placed on the turntable 200 and cradeled between the drive roll 265 and idler roll 290. The end of the web of wrapping material 105 is withdrawn from the supply roll in a vertical position relative to the floor and its end joined to the roll 315 in the manner described previously with respect to the operation of the first embodiment. Appropriate switches in the control panel 310 are actuated to operate the reversible motor 220 in the direction of arrow 225 (FIG. 11), thereby operating the speed reducer 234 and rotating the turntable 200 in a horizontal plane parallel to the floor; this motion rotates the roll 315 end-for-end in a plane parallel to the floor. At the same time, the drive roll 265 is caused to rotate through its drive connections with the speed reducer 234 and it bears against the outer periphery or the curved side surface of the roll 315 to cause it to rotate about its longitudinal axis. The idler roll 290 also rotates about its shaft 289 as the roll 315 is rotated. After the desired layers of wrapping material are applied about the roll 315 in the manner illustrated in FIGS. 1B–1G, the motor 220 is reversed to rotate in the opposite direction, i.e. that illustrated by the arrow 229 in FIG. 11. The rotation of the turntable and the drive roll 265 is thereby stopped, and the air compressor 301 is driven through its connection with the pulley 230 attached to the second overrunning clutch 228; high pressure air is supplied to the cylinders 295 and 298 and the idler roll is thereupon pivoted to its raised position as illustrated in FIG. 12 to thereby eject the wrapped roll 315 off the turntable onto the floor so that it may be picked up and transported to any desired location.

The apparatus and method of our new wrapping system as described above are based upon the general concept of covering all surfaces of an object with a web of wrapping material by simultaneously rotating the object about two different axes of rotation which intersect and are angularly displaced from one another. Thus, the object to be wrapped is rotated about a first axis of rotation and simultaneously rotated about a second axis of rotation intersecting and angularly displaced from the first axis of rotation. In a specific form, the first axis of rotation is a longitudinal axis of the object and the second axis is perpendicular thereto; more particularly, the first axis is in a horizontal plane and the second axis is in a vertical plane. A web of wrapping material is thereby wrapped about the object in a series of overlapping rows to cover all surfaces of the object; with a cylindrical object, the web of wrapping material covers both its end surfaces and its curved peripheral surface with a series of overlapping spirally-wound rows to completely enwrap the object. This basic concept of biaxially rotating the object to cover it with wrapping material enables the formation of a complete package enclosure about the object with a web of wrapping material that is narrower in width than the width of the object.

In its apparatus aspect, the present invention provides means for rotating an object to be wrapped about a first axis of rotation combined with means for rotating it about a second axis of rotation intersecting and angularly displaced from the first axis of rotation, both of said means being adapted to operate simultaneously. One axis may be in a horizontal plane and the other in a vertical plane; in a specific form, the apparatus includes turntable means to rotate the object about a vertical axis, drive means on the turntable means that rotates the object about its longitudinal axis, and means to operate both the turntable means and the drive means simultaneously. A still more specific form of apparatus further includes means for ejecting a wrapped object from the turntable means after it has been completely covered with wrapping material.

Apparatus as described herein has minimal space requirements, it can wrap various lengths of rolls or other objects on a random basis, and it eliminates the need to have a surge area or collection area in which to group a number of rolls of similar lengths prior to wrapping. A tight protective wrapper can be formed about a cylindrical object as a plurality of overlapping spirally-wound rows of wrapping material which cover all the surfaces of the object. A tight full wrapper that protects the object from dirt, moisture and handling damage is thereby produced. This is accomplished without the use of headers or end cap members and without the requirement for gluing or the need to have a clamping station. The wrapping can be accomplished in a rapid, efficient manner, and the equipment may be operated by one person.

Various types of wrapping materials can be employed in the practice of the present invention. Stretch wrap plastic film, such as polyethylene, nylon, PVC, a film of polyethylene and PVC blended together, etc. may be employed. Also, crepe paper, cloth or adhesive-backed paper, various laminated materials such as paper-film or paper-foil constructions, and corrugating medium can be employed as the wrapping material. The web of wrapping material can be of various widths, generally narrower than the object being wrapped, depending upon the size of the object and the degree of overlap desired between the adjacent rows of the spirally-wound wrapping material. The wrapping material can be selected on the basis of whether decorative packaging is required, in which event printed materials can be used, or it can be selected solely on the basis of the nature of the protective function required of the wrapping material, such as strength, moisture protection, etc. Glue or adhesive such as casein, hot melt, etc., can be applied in a narrow ribbon to the bottom inside edge of the wrapping material as it is being pulled from the supply roll. This adhesive will seal to the previous wrap on the object being wrapped and provide an air tight seal on any type of wrapping material such as paper, corrugate, or plastic film or laminate. This method will provide the effect of a glue-laminated wrapper covering the entire object.

The first embodiment of the apparatus described above is particularly adaptable for attachment to various commercially available stretch wrapping equipment such as that presently marketed by Litco Products Company, Infra Pak, Lantech and Amacor Corp., as well as similar equipment sold by other companies. Such equipment generally includes a means to supply a web of wrapping material under controllable tension and a turntable to which our new apparatus can be attached.

Our calculations indicate that our new wrapping system requires less time and less material in order to provide a more protective wrapping than the typical methods now in use. Based upon wrapping a 1500 lb. roll of paper, 50" in diameter and 50" in width, we calculate that our new system can apply a double layer of 1 mil polyethylene film about the roll in a time, including loading the roll to be wrapped, of 0.55 minutes at a material cost of about $.78. In contrast, using present methods to apply a paper wrapper about the same roll would require 1.75 minutes, including the time to load the roll, place the end cap members and crimping the wrapper, at a material cost of about $1.35. Also, using presently available plastic stretch wrap film equipment to wrap the same roll of paper would require approximately 1.95 minutes, including the time to place the headers and end cap members on the roll, at a material cost of about $1.20. Thus significant cost and time savings are available through the practice of our present invention. Other of our calculations show that using a large plastic bag to wrap the above sized roll of paper in a paper mill results in a "slab-off waste" of about 1.56%, including damage to the outer layers of the roll of paper, core waste, waste due to splices and breaks, and any other waste of paper during the run but excluding quality control waste. In comparison, tests with our new method for wrapping rolls have shown a slab-off waste of about 0.74% of the paper produced on a paper machine. In other words, the amount of paper wasted was reduced by more than one-half, and the 0.82% less waste obtainable with our present invention translates into a significant amount of paper when one considers the many paper machines produce from 10 million or 20 million pounds of paper per year or more. We believe that the savings in the reduction of paper lost due to damage are greater than the cost of wrapping in accordance with our present invention.

The second form of apparatus described above integrates a means for ejecting the wrapped roll from the apparatus with the basic wrapping mechanism, this being accomplished by the pivotal idler roll construction employed therein. This feature allows loading of an unwrapped roll and the unloading of a fully wrapped roll at various positions of the turntable. This version also contains a fully self-contained air supply, thereby eliminating the need for remote air supply. A reversible motor is employed in a unique manner to drive two different functions of the machine at alternate times. The unit is particularly accessible for servicing from the top of the unit and its supporting casters are carried by the turntable itself instead of being mounted on a separate structure. This version is a particularly effective machine that is compact so as to require minimal floor area and combines all elements helpful to efficient operation in a single unit.

Two specific embodiments of our invention have been described in detail above, and both are suitable for its practice. Nevertheless, it is expected that those skilled in the art will be capable of devising other embodiments, or modifying the embodiments disclosed, while remaining within the scope of our invention. For example, other turntable means can be designed, alternate drive means can replace the drive roll specifically disclosed, various systems can be adapted to simultaneously operate the means for rotating the object about two different axes of rotation, and a hydraulic circuit can be substituted for the pneumatic circuit illustrated above. The disclosure is meant to be exemplary of our invention and to teach the best modes presently known to us for its practice.

We claim:

1. Apparatus for completely covering a cylindrical object having a longitudinal axis, a curved peripheral surface and spaced end surfaces with a web of wrapping material comprising, in combination:

turntable means adapted for rotation in a generally horizontal plane;

rotatable drive roll means on the turntable means and adapted to drivingly engage the curved peripheral surface of the cylindrical object;

idler roll means on the turntable and spaced from the drive roll means to form a cradle therebetween within which a cylindrical object to be wrapped is carried;

means pivotally supporting the idler roll for movement between a lowered first position and a raised second position;

means for supplying a web of wrapping material to an end surface of the cylindrical object;

means for simultaneously rotating the turntable means and the drive roll means to rotate the cylindrical object in a horizontal plane while simultaneously rotating it about its longitudinal axis and thereby cover the curved peripheral surface and the end surfaces of the cylindrical object with a series of spirally-wound overlapping rows of wrapping material;

means to pivot the idler roll to its raised second position to eject a wrapped cylindrical object from the apparatus the means for simultaneously rotating the turntable and the drive roll means including a reversible motor arranged to rotate the turntable means and the drive roll means when rotating in a first direction and arranged to drive the means to pivot said idler roll to its raised second position when rotating in a second direction opposite to the first direction.

2. Apparatus according to claim 1, wherein:

the means for simultaneously rotating the turntable means and the drive roll means includes a reversible electric motor and a speed reducer, with the electric motor arranged to drive the speed reducer when rotating in said first direction and with the speed reducer connected to rotate the turntable means and the drive roll means when the motor rotates in said first direction; and the means to pivot the idler roll includes an air compressor and air cylinder means which receives air from the air compressor, said electric motor being arranged to drive the air compressor when rotating in said second direction opposite to said first direction.

* * * * *